Patented Apr. 8, 1941

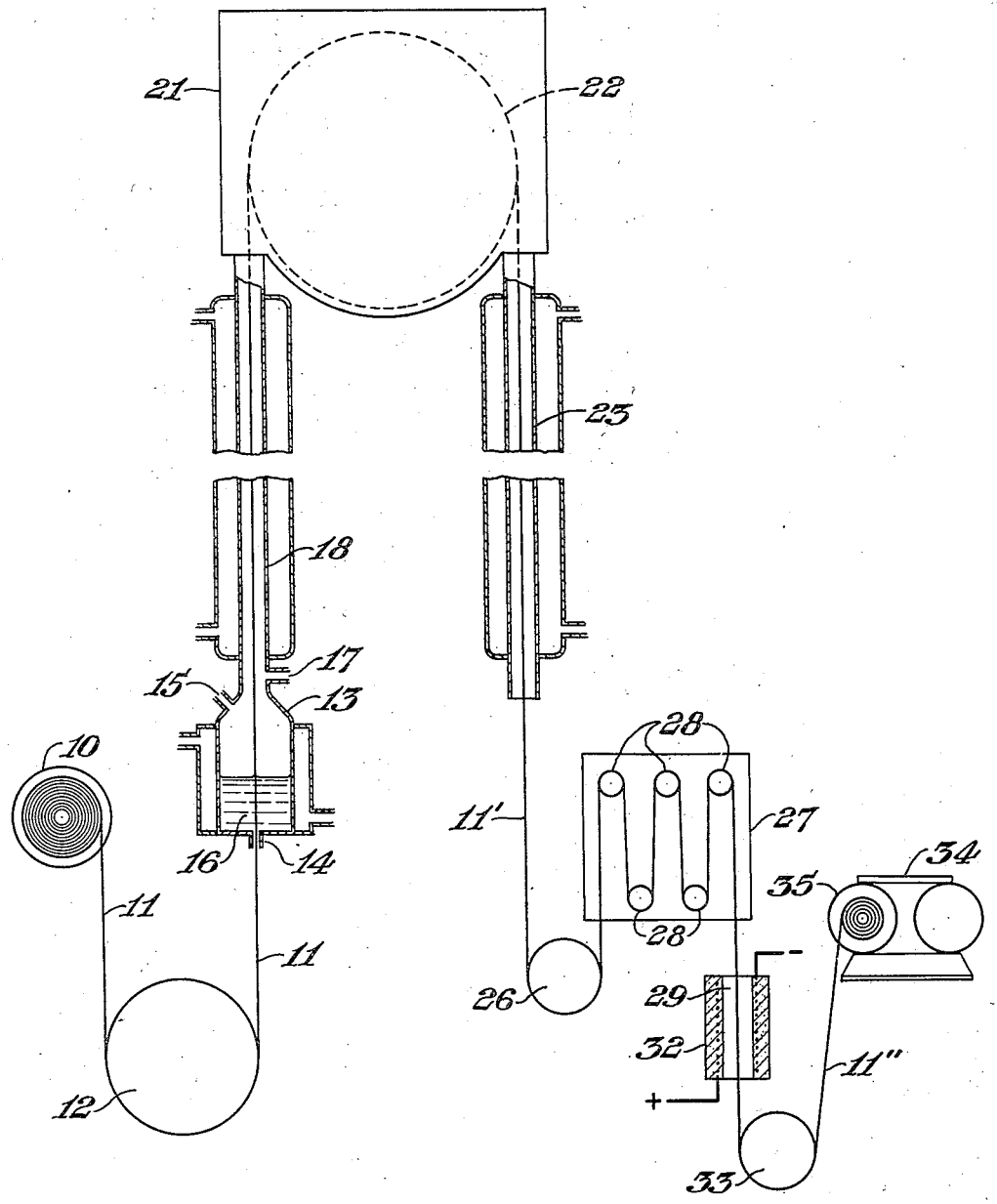

2,237,315

UNITED STATES PATENT OFFICE 2,237,315

COATING FILAMENTOUS ARTICLES WITH VINYLIDENE CHLORIDE COMPOSITIONS

John H. Reilly, Midland, Mich., assignor to The Dow Chemical Company, Midland, Mich., a corporation of Michigan Application August 24, 1938, Serial No. 226,489

7 Claims. (Cl. 91—70)

This invention relates to a method of and composition for coating wire, cordage, and other continuous filaments, and to the product thereby obtained.

Among the desirable properties of insulated wire for electrical service are uniformity, flexibility, abrasion resistance, non-flammability, moisture impermeability, high dielectric strength, low power factor, and high softening point of the insulation. Enamel-coated wire is apt to be non-uniform in cross-section and to be brittle, some enamels tending to chip from the wire, either when flexed or abraded. Some of the synthetic plastics heretofore used for wire coating do not have sufficiently high softening points or are not tough enough for general utility. When many of the synthetic resins are plasticized sufficiently to provide flexible coatings, they are too soft for many types of electrical service and are generally poorer dielectrics than the unplasticized resins. In short, none of the heretofore employed wire coating compositions have all of the desired properties to a sufficient degree to provide a coated wire suitable for application to varied fields of service.

It is, accordingly, among the objects of the present invention to provide a composition adapted to be applied to wire, and the like, to produce a coated article, whereof the coating is characterized by high uniformity, flexibility, abrasion resistance, moisture impermeability, non-flammability, high dielectric strength, low power factor, and high softening point. It is a further object to provide a coated wire or similar filamentous article, whereof the coating has the aforesaid properties. Another object of the invention is to provide a method whereby a coating having the said desired properties may be applied to wire or other non-thermoplastic continuous filaments, such as string, cord, rope, thread, and the like.

To the accomplishment of the foregoing and related ends, the invention, then, consists of the composition, method and product hereinafter fully described and particularly pointed out in the claims, the annexed drawing setting forth in detail one mode of carrying out the invention, such disclosed mode illustrating, however, but one of various ways in which the principle of the invention may be used.

I have now found that the foregoing objects may be attained by employing, as the coating composition, a solution or dispersion of polymeric vinylidene chloride in a liquid dispersion medium for the said polymer, the said medium boiling above 140° and preferably above 160° C. Suitable examples are orthodichlorobenzene or trichlorobenzene. The said dispersion or solution is obtained by heating the polymer with the chlorinated benzene or other dispersion medium to a temperature above 140° C., and preferably to a temperature of about 150°–160° C., and is applied to the wire at or near 150°–155° C.

My preferred wire-coating composition comprises the following ingredients, in the stated proportions, by weight:

Vinylidene chloride polymer_____per cent__ 25 to 35
Solvent (orthodichlorobenzene or trichlorobenzene)_____per cent__ 75 to 65
Sodium stearate_____
_____per cent of weight of polymer__ 0.2 to 2

The polymer which I prefer to employ is that of pure vinylidene chloride, having a softening point of 180°–190° C. When vinylidene chloride is polymerized, it contains a minute amount (less than 1 per cent) of an acetone-soluble material which, for the purposes of this invention, should be extracted from the main body of acetone-insoluble polymer in order to increase the stability of the polymer toward heat. The so-purified polymer may be heated continuously to 150°–200° C. without exhibiting darkening or other evidences of decomposition. If the traces of acetone-soluble material are left in the polymer, it may be stabilized against thermal decomposition by the addition of agents adapted to the purpose, e. g. the dye Oil Red B, Oil Red R (benzene azo-benzene azo-beta-naphthol). The desired stabilizing effect is produced by employing about 0.2 per cent of the dye, based on the weight of the polymer in the coating solution. The sodium stearate is used in the coating composition to assist in the dispersion of the polymer in the chlorinated benzene, and to toughen the coating of polymer deposited from the dispersion. The coating composition should not be heated in iron apparatus, since continued contact with hot iron appears to catalyze decomposition of the vinylidene chloride dispersion. Nickel, monel, or ceramic vessels may be used when heating the composition during a coating operation.

A method of applying a coating of vinylidene chloride to wire, cordage, or similar continuous filaments, will be described with reference to the annexed drawing.

The single figure of the said annexed drawing is a diagrammatic view of an apparatus wherein the coating operation of the present invention may be carried out.

According to one practical adaptation of the invention, a wire 11 is unwound from supply reel 10 and passed under guide pulley 12, the diameter of which is large enough to assist in straightening kinks or waves in the wire which has been wound on a spool of smaller diameter. Pulley 12 is so positioned with respect to the rest of the apparatus that wire 11 is drawn vertically from this wheel into the steam-jacketed coating chamber 13, through orifice 14. The coating pot 13 is filled with the previously defined coating composition 16, which is admitted to the pot through an ordinarily closed aperture 15. The temperature of bath 16 is held at 145°–160° C., and preferably near 150°–155° C., suitably by heating pot 13 with steam at 55 to 75 pounds gauge pressure. The coating composition 16 cannot leak through orifice 14 since the composition sets to a semi-solid gel at temperatures at or below 140° C.

The wire 11 is drawn from below vertically through bath 16 into steam-jacketed heating chamber 18 which is heated to 150°–160° C., and optimally to 155° C. with 55–70, and preferably 65 pound steam. Lower temperatures, e. g. those produced by 50 pound gauge steam pressure, cause the coating to blister from the wire, while higher temperatures, producible by 80 pound steam, cause the coating to flow and drip from the wire. A slow stream of pre-heated air is admitted to the inner tube of heater 18 through an inlet 17, to sweep from the system solvent vapor escaping from the freshly coated wire. The solvent vapor may be trapped in an absorbent or by suitable condensing means, and recovered.

The coated, partially dried, and substantially non-tacky wire is drawn from heater 18 over a large pulley 22 covered by housing 21, to which a solvent recovery system may be connected. The diameter of wheel 22 is such that the wire is not sharply bent around a short radius of curvature while passing over the pulley, thus preventing the still porous and partially dried coating from flattening or sloughing from the wire. Further drying is accomplished in steam-jacketed chamber 23. The substantially dry wire 11' is conveyed over pulley 26 into a drying oven 27 which is heated with steam at about 140–150 pounds gauge pressure, i. e. at a temperature up to about 185° C.—near, but not exceeding, the softening point of the vinylidene chloride polymer. The wire passes back and forth over guides 26, the number of which may be altered to provide sufficient drying time in the oven to remove substantially all remaining traces of solvent from the plastic coating. After leaving the oven 27 the solvent-free coated wire is heat-treated to prevent the coating from becoming brittle when cold. The heat-treatment is effected suitably by drawing the wire through the hollow core 29 of an electrically heated, thermally insulated furnace 32. The internal temperature of the furnace is adjusted so that the wire coating, in its brief period in the furnace, is heated to 200° to 220° C. The annealed coating on the wire 11'' may be allowed to cool gradually to room temperature, or it may be chilled, e. g. in ice-water, to lower the "brittle point" of the coating. The finished wire 11'' is finally passed over a guide roll 33 and wound on a spool 35 by means of a variable speed drive 34.

From time to time, as needed, the coating composition 16 in pot 13 may be replenished through the opening 15, or a constant level of the coating composition may be maintained in pot 13 by suitable connection with a larger outside supply of the hot composition.

Motion is imparted to the wire solely by the reel drive 34, only sufficient tension being maintained to overcome the friction of the various pulleys and wire guides. The greater the wire speed, the thicker is the coating, since the cool wire entering the bath 16 through orifice 14 congeals a portion of the composition, and the more rapidly the wire passes through the bath, the less opportunity is there for the temperature to equalize between the wire and the bath. At high coating speeds it is desirable to preheat the wire to coating bath temperature.

The drying oven 28 may, if desired, be replaced by a series of driers similar to 18 and 23, with each successive drier at a slightly higher temperature, up to about 180° C. The heat treatment accomplished in furnace 29, may also be effected in a heated finishing die, or in a bath of hot oil or glycerine at 200°–220° C. The arrangement shown is believed to be the better one, since no pressure is applied to the coating, and hence, no distortion occurs during the heat-treating step. Wire coated by the method just described will be found to be perfectly centered in its insulation, and to be uniform in cross-section.

As an alternative to the method described wherein the wire is lifted vertically from the coating bath, the wire may be passed downward through the bath, emerging through an orifice at the bottom with a sheath of the coating composition congealed around the wire. Thereafter the same drying steps are employed as described above. Such a process amounts, in effect, to an extrusion of the jellifiable coating composition around the wire, at atmospheric pressure. In either mode of operation, the wire is moved into and vertically out of the coating bath, and an expression to that effect in the claims is intended to include upward or downward motion of the wire away from the bath.

I have coated single and multiple strand wire according to the method herein described, using an apparatus similar to that shown in the drawing. The so-obtained coated wire is highly flexible at temperatures down to 0° F. (−18° C.), and the insulation is thoroughly water-proof, non-flammable, highly resistant to abrasion, and has high dielectric strength (greater than 1000–3000 volts per mil, depending on thickness), low power factor, and does not soften enough to flow at temperatures below 180° C. The coated wire has a glossy appearance, and for many purposes may be used with no further covering. For some types of service the wire may be further coated or wrapped with other insulation, e. g. silk, cotton, rubber, and the like, the vinylidene chloride coating providing the desired moisture-proofness and the initial insulation, while added coverings augment the already satisfactory properties of the polymer coat, and "dress-up" the wire for decorative purposes, etc., or are used to comply with certain existing statutory requirements laid down before the modern plastics were adapted to this type of service.

The invention has been illustrated with respect to the coating of wire for electrical service. Other continuous filamentous articles such as rope or string may be coated in an analogous manner, to produce strong, waterproof, long-wearing, chemical-resistant twine, and the like, which is relatively free from attack by fungus, mold, or soil bacteria which ordinarily cause rotting and weakening of cordage. When cordage is so coated it remains flexible enough to be tied readily, but is somewhat stiffer than the uncoated article. It has been found that the vinylidene chloride coating adheres to the cordage, even though bent and twisted in the ordinary uses to which such filaments may be put. Among the places in which such a cord or rope may be put to use with advantage are on board ship, where salt spray rots ropes, or in corrosive atmospheres generally, as, for example, around a chemical factory. Vinylidene chloride-coated ropes will outlast tarred ropes used in making fish nets, and the like, and are considerably lighter in weight and cleaner to handle. Similarly, a coating applied in the herein-described manner to a fishing line will give a permanently water-proof, free-running line, especially desirable for casting or trolling, the said line being sufficiently resistant to abrasion to outlast the ordinary line many times, and having, per unit cross-sectional area, far greater tensile strength than the usual lines.

The filaments which may be coated by the present process may be of any material which is insoluble in the chlorinated benzenes or other dispersion medium employed, and which does not soften, melt or char at coating temperature.

The composition herein described has comprised the polymer of vinylidene chloride. Similar results may be obtained with inter-polymers (co-polymers) of vinylidene chloride with other polymerizable materials. Such co-polymers however, have as a rule considerably lower softening points than the polymer of pure vinylidene chloride alone, hence lower drying and annealing temperatures must be used with the co-polymers, than those given in the example wherein the polymer of vinylidene chloride alone is used. The present method is particularly adapted to the coating of wire or cordage with a composition comprising polymeric vinylidene chloride or those of its co-polymers which contain a major proportion of vinylidene chloride and have high softening points (above about 170° C.) and the other desirable properties such as dielectric strength, etc.

Of the chlorobenzenes disclosed as solvents or dispersing agents, viz. orthodichlorobenzene and trichlorobenzene, I prefer to us trichlorobenzene, partly because of its lower vapor pressure at coating bath temperatures, hence lower solvent losses, and partly because a coating of a vinylidene chloride polymer deposited from trichlorobenzene dispersion appears to be tougher and more permanently plastic, even when every effort has been made to remove last traces of solvent, than a coating of the same polymer deposited from orthodichlorobenzene.

Instead of the sodium stearate employed as a dispersion assistant and toughening agent, there may be used other soaps, either hard or soft, soluble or insoluble. For example, calcium, magnesium, or lead stearates may be used as toughening agents, and potassium stearate, palmitate, or oleate as dispersion agents. Because of the combination of desirable results obtained through the use of sodium stearate in small quantities, i. e. 0.2–2 per cent of the weight of polymer, this compound is preferred.

While the invention has been illustrated with respect to, and is concerned primarily with, the coating of substantially continuous filamentous articles, it is to be understood that the general principles involved may likewise be applied to the coating of relatively short individual pieces of any material not affected by the dispersion medium employed and which is non-thermoplastic at coating, drying, and annealing temperatures.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method which comprises the steps of moving a wire into and vertically out of a bath at a temperature between about 145° and 160° C., and comprising from 25 to 35 parts by weight of the polymer of vinylidene chloride dispersed in from 75 to 65 parts by weight of trichlorobenzene, moving the freshly coated wire vertically through a zone heated to about 155°±5° C., to remove sufficient of the trichlorobenzene from the coated wire so that it may be bent without distortion of the coating, moving the partially dried coated wire through another zone heated to a temperature near, but not exceeding, the softening point of the polymeric vinylidene chloride whereby remaining traces of trichlorobenzene are substantially completely removed, moving the dried coated wire through a relatively short annealing zone wherein the temperature of the coating is raised to between about 200° and 220° C., to obtain a symmetrically coated wire whereof the coating is characterized by uniformity, flexibility, abrasion resistance, moisture-impermeability, non-flammability, high dielectric strength, low power factor, and softening point above 170° C.

2. The method which comprises the steps of moving a wire into and vertically out of a bath at a temperature between about 145° and 160° C., and comprising from 25 to 35 parts by weight of the polymer of vinylidene chloride dispersed in from 75 to 65 parts by weight of trichlorobenzene, the said bath containing a soap to the extent of about 0.2 to 2 per cent of the weight of the polymer, moving the freshly coated wire vertically through a zone heated to about 155°±5° C., to remove sufficient of the trichlorobenzene from the coated wire so that it may be bent without distortion of the coating, moving the partially dried coated wire through another zone heated to a temperature near, but not exceeding, the softening point of the polymeric vinylidene chloride whereby remaining traces of trichlorobenzene are substantially completely removed, moving the dried coated wire through a relatively short annealing zone wherein the temperature of the coating is raised to between about 200° and 220° C., to obtain a symmetrically coated wire whereof the coating is characterized by uniformity, flexibility, abrasion resistance, moisture impermeability, non-flammability, high dielectric strength, low power factor, and softening point above 170° C.

3. The method which comprises the steps of moving a wire into and vertically out of a bath at a temperature between about 145° and 160° C., and comprising from 25 to 35 parts by weight of the polymer of vinylidene chloride dispersed in from 75 to 65 parts by weight of trichlorobenzene, the said bath containing sodium stearate to the extent of about 0.2 to 2 per cent of the weight of the polymer, and a stabilizer for the said polymer, moving the freshly coated wire vertically through a zone heated to about 155°±5° C., to remove sufficient of the trichlorobenzene from the coated wire so that it may be bent without distortion of the coating, moving the partially dried coated wire through another zone heated to a temperature near, but not exceeding, the softening point of the polymeric vinylidene chloride whereby remaining traces of trichlorobenzene are substantially completely removed, moving the dried coated wire through a relatively short annealing zone wherein the temperature of the coating is raised to between about 200° and 220° C., to obtain a symmetrically coated wire whereof the coating is characterized by uniformity, flexibility, abrasion resistance, moisture-impermeability, non-flammability, high dielectric strength, low power factor, and softening point above 170° C.

4. The method which comprises moving a filamentous article which does not soften, melt or char at the coating, drying and annealing temperatures, and which is not affected by the dispersion medium in the following steps, into and vertically out of a bath at a temperature between 145° and 160° C., and comprising from 25 to 35 parts by weight of a polymeric material selected from the group consisting of the polymer of vinylidene chloride and those of its co-polymers which soften above 170° C., dispersed in from 75 to 65 parts by weight of a liquid medium selected from the class consisting of orthodichlorobenzene and trichlorobenzene, moving the freshly coated filamentous article vertically through a zone heated to about 155°±5° C., to remove sufficient of the liquid medium from the coated article so that it may be bent without distortion of the coating, moving the partially dried coated article through another zone heated to a temperature near, but not exceeding, the softening point of the polymeric material, whereby remaining traces of the liquid medium are substantially completely removed, moving the dried coated article through a relatively short annealing zone wherein the temperature of the coating is raised to between about 200° and 220° C., to obtain a symmetrically coated article, whereof the coating is continuous, moisture impermeable, non-inflammable, abrasion resistant, of high tensile strength, and of substantially uniform thickness.

5. The method which comprises the steps of moving a wire into and vertically out of a bath at a temperature between 145° and 160° C., and comprising from 25 to 35 parts by weight of a polymeric material selected from the group consisting of the polymer of vinylidene chloride and those of its co-polymers which soften above 170° C., dispersed in from 75 to 65 parts by weight of a liquid medium selected from the class consisting of orthodichlorobenzene and trichlorobenzene, moving the freshly coated wire vertically through a zone heated to about 155°±5° C., to remove sufficient of the liquid medium from the coated wire so that it may be bent without distortion of the coating, moving the partially dried coated wire through another zone heated to a temperature near, but not exceeding, the softening point of the polymeric material whereby remaining traces of the liquid medium are substantially completely removed, moving the dried coated wire through a relatively short annealing zone wherein the temperature of the coating is raised to between about 200° and 220° C., to obtain a symmetrically coated wire, whereof the coating is continuous, moisture impermeable, non-inflammable, abrasion resistant, of high tensile strength, and of substantially uniform thickness.

6. The method as claimed in claim 5, wherein the liquid dispersion medium is orthodichlorobenzene.

7. The method as claimed in claim 5, wherein the liquid dispersion medium is trichlorobenzene.

JOHN H. REILLY.